United States Patent
Koeper et al.

(12)

(10) Patent No.: US 6,464,025 B1
(45) Date of Patent: Oct. 15, 2002

(54) COAST CONTROL FOR WALKIE/RIDER PALLET TRUCK

(75) Inventors: John Ivan Koeper, New Bremen; Daniel Carl Magoto, Russia; Allen Thomas Trego; James Francis Schloemer, both of New Bremen, all of OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 09/855,333

(22) Filed: May 15, 2001

(51) Int. Cl.[7] ................................................. B62D 1/14
(52) U.S. Cl. ...................................... 180/19.2; 180/332
(58) Field of Search ........................ 180/19.1, 19.2, 180/19.3, 11, 12, 13, 315, 320, 332, 333, 334

(56) References Cited

U.S. PATENT DOCUMENTS

| | | | |
|---|---|---|---|
| 3,791,474 A | | 2/1974 | Stammen et al. |
| 3,876,024 A | * | 4/1975 | Shieman et al. .......... 180/19.1 |
| 4,716,980 A | | 1/1988 | Butler |
| 4,993,509 A | | 2/1991 | Howell |
| 5,245,144 A | | 9/1993 | Stammen |
| 5,890,562 A | | 4/1999 | Bartels et al. |
| 5,964,313 A | | 10/1999 | Guy |

* cited by examiner

Primary Examiner—Kevin Hurley
(74) Attorney, Agent, or Firm—Stevens & Showalter LLP

(57) ABSTRACT

A coast control device for a walkie/rider pallet truck locks the position of a steering arm of the truck to prevent movement by a deadman mechanism. The disclosed locking device is a brake: an armature plate mounted to the steering arm; and an electromagnet coupled to a steering head that is operated to activate coasting operation. The brake force can be overcome by an operator to manually apply the truck brake or to reposition the steering arm to a new position where it is again locked. For controlling coasting operation, the brake is manually engaged by an actuator mounted adjacent to or on a grab bar that is to be gripped by an operator riding on the truck. With the actuator so located, coasting operation can be conveniently engaged while the operator is walking beside the truck.

27 Claims, 6 Drawing Sheets

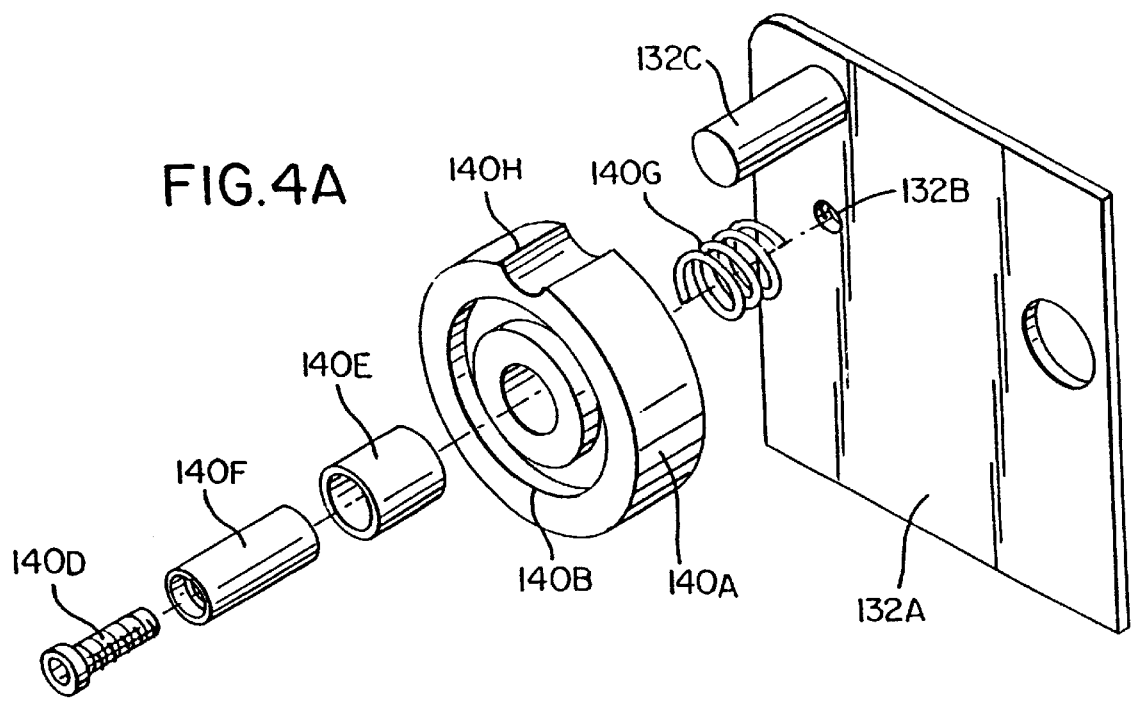
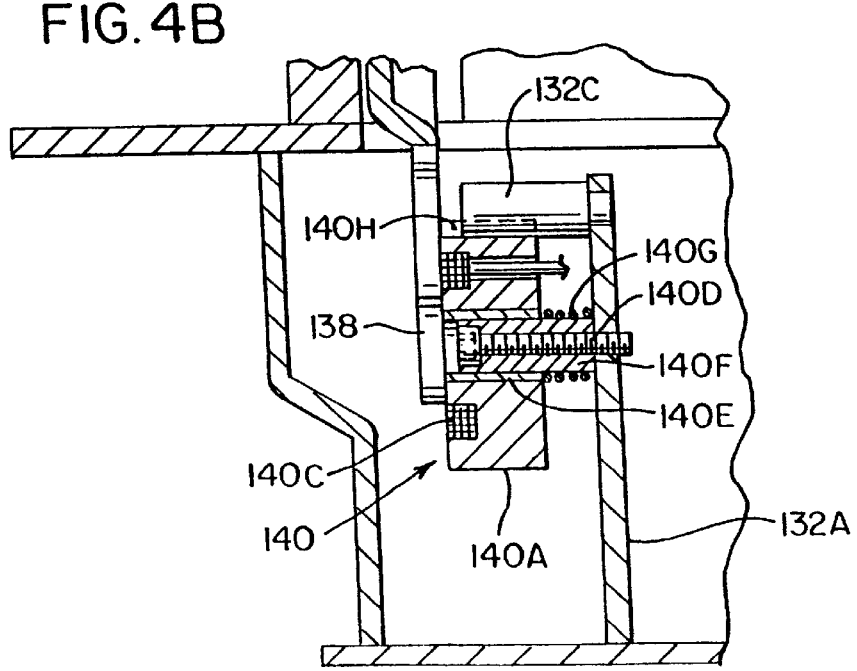

COAST CONTROL FOR WALKIE/RIDER PALLET TRUCK

BACKGROUND OF THE INVENTION

The present invention relates in general to end controlled walkie/rider pallet trucks commonly used for picking stock in large warehouses and, more particularly, to a coast control arrangement for improved operation of such pallet trucks.

A typical walkie/rider pallet truck includes load carrying forks and a power unit having a steerable wheel, a steering control mechanism, a brake including a deadman brake mechanism, an electric traction motor, a storage battery and a platform onto which the operator may step and ride while controlling the truck. The steering mechanism normally has a handle mounted at the end of a movable steering arm with the handle including controls for raising and lowering the forks and rotatable twist grips or comparable devices to control the speed and direction (forward and reverse) of the truck. A switch for reversing vehicle travel direction when traveling in the power unit first or forward direction and a horn switch are also normally provided on the handle.

In stock picking operations, a truck operator typically follows a winding, unidirectional route through the warehouse, picking up stock in a predetermined sequence in order to maximize productivity. The operator normally walks alongside the truck when the distance along the route between picks is short and steps onto the truck platform to ride when the distance between picks is longer, for example twenty or more feet. When the operator is riding on the truck platform, it is desirable for optimum work productivity to move the truck at higher speeds than when the operator is walking beside it. To this end, speed controllers that include high and low speed control circuits are provided.

For movement of the truck, the operator grasps the handle and moves the steering arm into a truck operating range between a generally vertical (up) braking position and a generally horizontal (down) braking position. If the operator releases the handle, the deadman brake mechanism, for example comprising an arm return spring, forces the arm to the up braking position which actuates a spring-loaded brake to stop the truck. The operator can also actuate the spring-loaded brake by bringing the steering arm to the down braking position. Thus, the walkie/rider pallet truck may be in either a braking or non-braking mode, depending on the position of the steering arm within specified braking and operating arcs.

Rotation of the twist grips controls movement of the truck: rotation of either grip in one direction causes the truck to move with the power unit leading, the forward direction, while rotation in the opposite direction causes the truck to move with the load carrying forks leading, the backward or reverse direction. Increased rotation of the grip in either direction, when operated in either the walkie or the rider mode, results in an increase in the power supplied to the electric motor causing the truck to move at a higher speed in the corresponding forward or reverse direction.

In addition to the motion control provided by the rotatable twist grips, rider pallet trucks may also include side or "jog" switches. The jog switches can be turned on and off by an operator walking alongside the truck to move the vehicle at a walk speed of around 3.5 miles per hour (mph) (5.6 km/hr) to move from one stock pick position toward the next stock pick position. A single jog switch is normally provided on each side of the handle either on an outer portion of the handle or, preferably, on an inner, protected portion of the handle. An example of another jog switch arrangement, wherein a pair of switches, one on the outside of the handle and one on the inside of the handle, is provided on each side of the handle and both switches must be activated to move the truck, is illustrated in U.S. Pat. No. 5,245,144 which is entitled WALK ALONG HAND GRIP SWITCH CONTROL FOR PALLET TRUCK which issued on Sep. 14, 1995 to the assignee of the present application and is incorporated herein by reference.

The efficiency of stock picking is severely hampered if the brake is activated every time an operator releases the steering arm. Thus, brake override, or coasting, systems have been developed to override the deadman brake mechanism by preventing the steering arm from entering the up braking position when the operator releases the handle/steering arm while walking alongside the truck. When operating in the coast mode, arrangements are provided for a walking operator to apply the service brake and sound the horn.

One such system for deactivating a deadman brake is disclosed in U.S. Pat. No. 3,791,474 which is entitled MOTION SELECTOR DEVICE FOR A LIFT TRUCK and issued on Feb. 12, 1974 to Crown Controls Corporation, a predecessor in interest to the assignee of the present application. In the '474 patent, a spring device is manually pivoted into a position for engaging the steering arm and preventing the arm from entering a vertical braking arc under the force of a deadman spring.

Another system for deactivating a deadman brake is disclosed in U.S. Pat. No. 4,716,980 which is entitled CONTROL SYSTEM FOR RIDER VEHICLES and issued on Jan. 5, 1988. In the '980 patent, a selector switch is used to select either normal high speed operation or coasting operation and additional switches are then used to drive a truck within the high speed range or in the coast mode. Thus, the coasting system of the '980 patent requires manual engagement of the deadman brake override control device by the vehicle operator to put the truck in its coast mode or to disengage the coast mode for high speed travel.

Another system for automatic engagement and disengagement of a deadman brake is disclosed in U.S. Pat. No. 5,964,313 which is entitled MOTION CONTROL SYSTEM FOR MATERIALS HANDLING VEHICLE and issued on Oct. 12, 1999. In the '313 patent, a coast control device can only be engaged by activation of a jog button that actuates a low speed travel mode. The coast control device is deactivated by activation of a maximum speed control button or movement of speed control hand grips from their neutral position. The coast control device comprises a coast control spring that is compressed by a solenoid to apply a coast spring force that compensates the force provided by a handle return spring to constrain the steering arm to a driving arc. While the automatic engagement and disengagement of coast control improves on operation of the truck during stock picking, the disclosed coast control mechanism is mechanically complicated and, when engaged and the handle is released, forces the handle into a single detent-defined position within the driving arc. Further, since the coast control device can only be engaged by activation of the jog button, the '313 coast control cannot be used on vehicles that do not have the jog feature.

Accordingly, there is a need for a mechanically less complicated coast control arrangement for walkie/rider pallet trucks that would have less parts, be easier to assemble and maintain, and enable an operator to retain the handle at any position within the operating arc, allow the coast system to be overridden for applying the brake, allow coast to be used on walkie/rider pallet trucks that do not have the jog feature, limit truck speed to approximately 3.5 mph (5.6 km/hr) when the coast mode is selected, and provide improved operation of the truck for stock picking.

SUMMARY OF THE INVENTION

This need is met by the invention of the present application wherein a device locks the position of a steering arm of a walkie/rider pallet truck to prevent movement of the steering arm by a deadman mechanism that would otherwise move the steering arm into a generally vertical truck braking position. By locking the position of the steering arm to overcome the deadman mechanism, the truck is placed into a coast mode of operation. The currently preferred locking device is a steering arm brake comprising an armature plate mounted to and movable with the steering arm and an electromagnet coupled to a steering head to which the steering arm is movably mounted so that the armature plate moves over the electromagnet. The coast mode of truck operation is activated by operating the electromagnet to attract the armature plate and thereby lock the steering arm into the position it occupies when the coast mode is activated. While the braking force locks the steering arm and prevents movement of the steering arm by the deadman mechanism, the force can be overcome by the truck operator to manually apply the truck brake or to reposition the steering arm to a new position where it is again locked until it is once again moved to a new position, the truck is braked or the coast mode is released.

The invention of the present application also provides novel control for coasting operation of a walkie/rider pallet truck. A coast control mechanism for overriding a deadman brake to enable coasting operation of a walkie/rider pallet truck is manually engaged by an actuator or coast switch that is mounted on or closely adjacent to a grab bar that is provided on the truck and is to be gripped by an operator riding on the truck. The actuator can be on the grab bar, on a control panel mounted on the grab bar or mounted to be easily accessible by an operator's hand gripping the grab bar for operation of the truck and coast actuation. Coasting operation of the truck is cancelled by manually operating a high speed/coast release switch.

Additional features and advantages of the invention will be apparent from the following description, the appended claims and the accompanying drawings.

BRIEF DESCRIPTION OF THE DRAWINGS

FIG. 4A is a partially sectioned side view showing resilient biasing of an electromagnet of a steering arm brake into an armature plate of the brake;

FIG. 4B is a partially sectional view of the steering arm brake taken along the section line 4B—4B of FIG. 4;

DETAILED DESCRIPTION OF THE INVENTION

Figure 1:
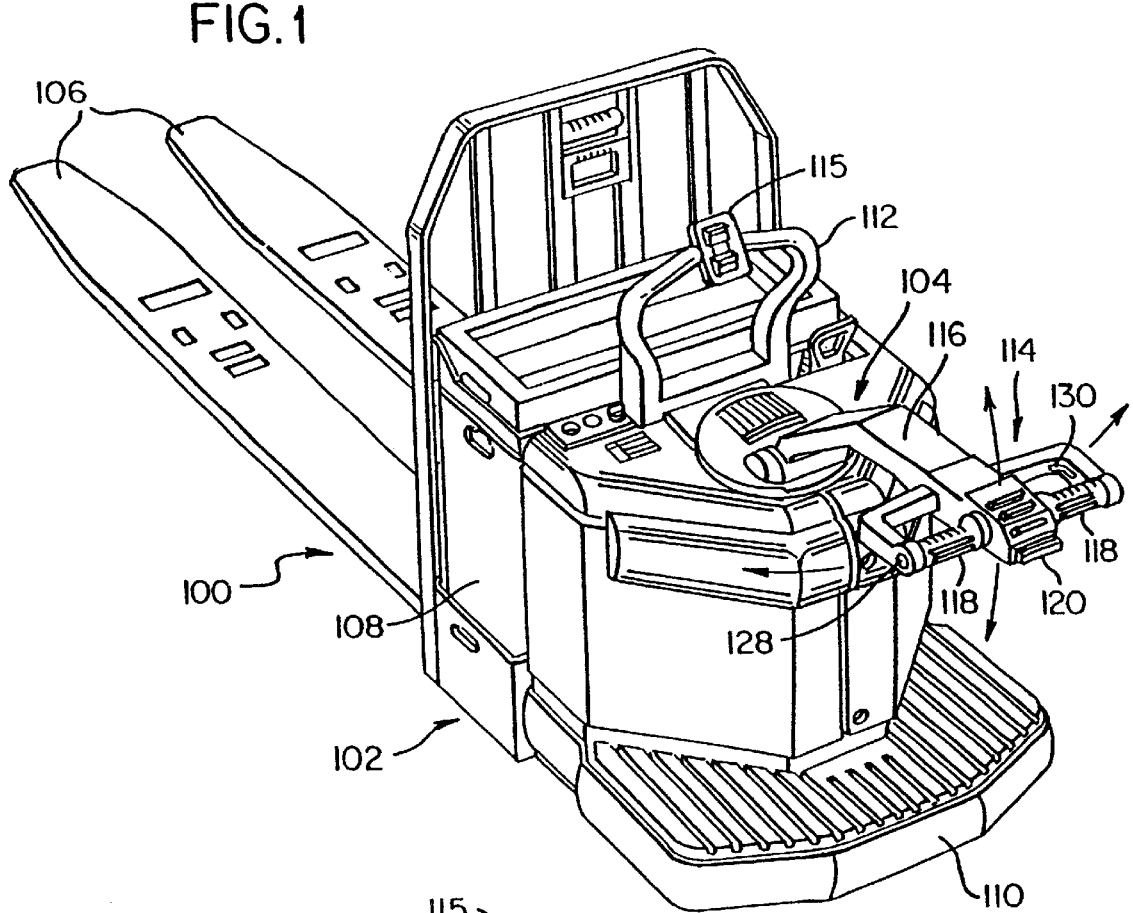
FIG. 1 is a perspective view of a walkie/rider pallet truck of the type into which the present invention is incorporated.
Figure 1A:
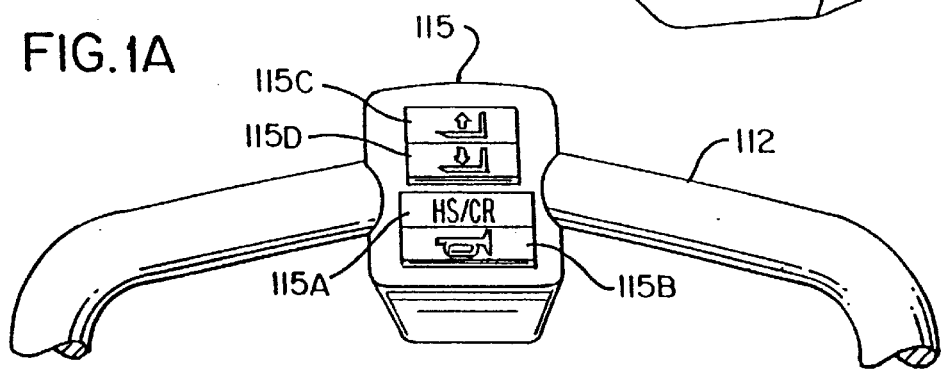
FIGS. 1A and 1B are perspective front and rear views, respectively, of a control panel mounted on a grab bar of the truck of FIG. 1.
Figure 1B:
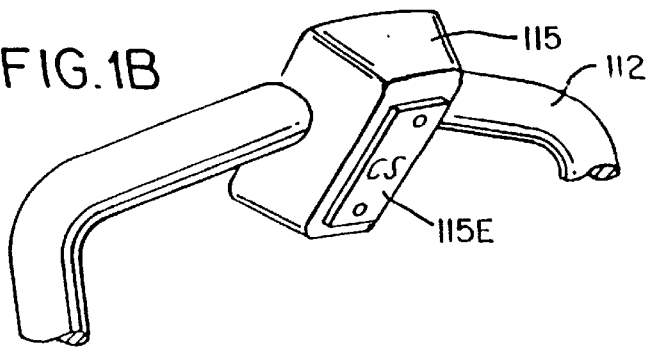

Reference will now be made to the drawings for description of the coast control mechanism and control of the present application. In the drawings, FIG. 1 illustrates a walkie/rider pallet truck 100 including and operable in accordance with the present invention. The truck 100 includes a power unit 102, a steering control unit 104, and load carrying forks 106 that extend rearwardly from the power unit 102. The power unit 102 contains a steerable wheel (not shown), usually located directly beneath the steering control unit 104, an electric traction motor (not shown), and an electric storage battery 108. The power unit 102 also includes a platform 110 onto which an operator may step and ride while controlling the truck 100. A hand rail or grab bar 112 is provided for an operator to grip while riding on the platform 110. A control panel 115 is mounted on the grab bar 112 and includes a high speed/coast release switch (HS/CR) 115A, a horn switch 115B, a raise forks switch 115C, a lower forks switch 115D and a coast switch (CS) 115E. See FIGS. 1A and 1B.

Figure 2:
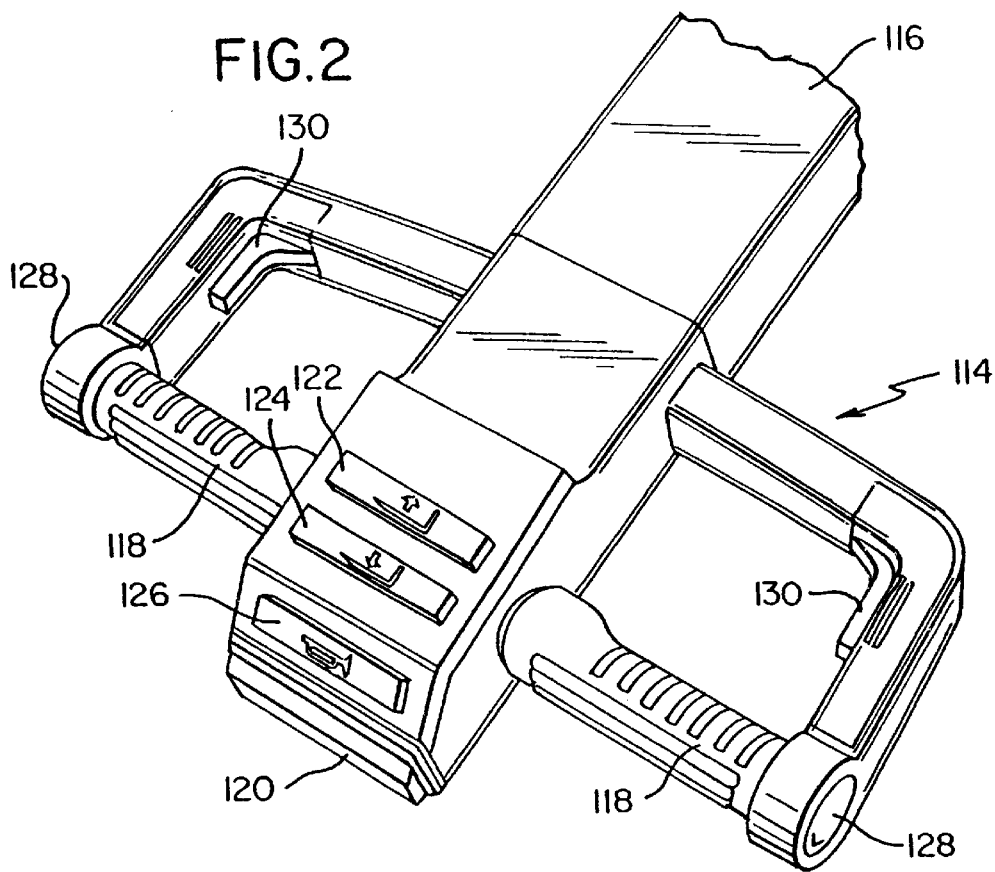
FIG. 2 is a perspective view of a control handle of the truck of FIG. 1.
Figure 3:
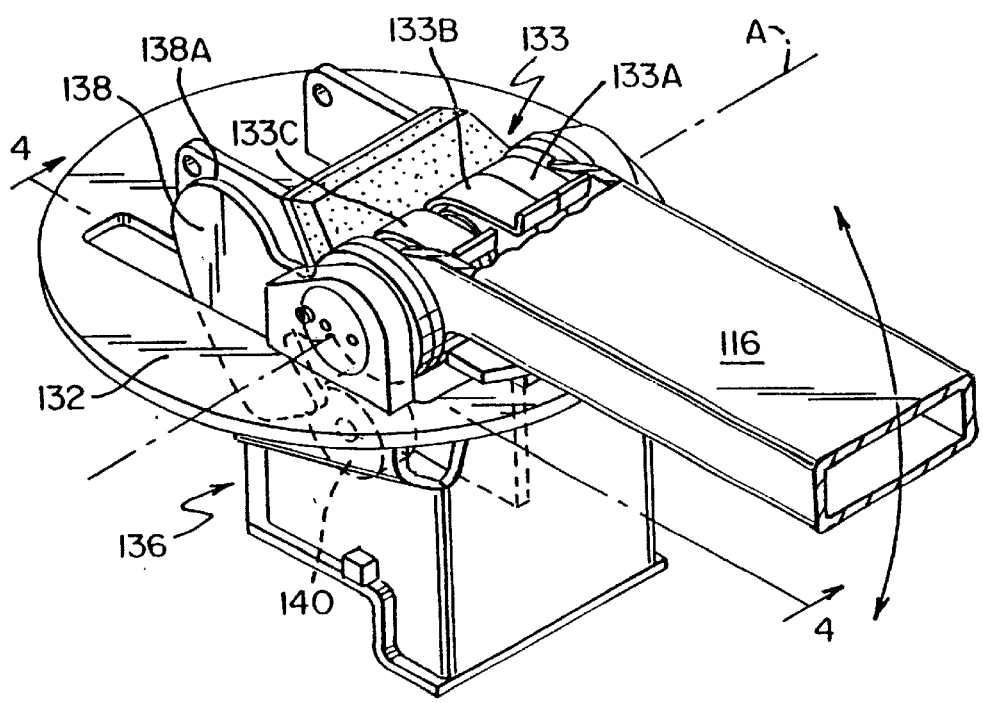
FIG. 3 is a perspective view of a portion of a steering control unit of the truck of FIG. 1 showing the pivoting movement of a steering arm of the truck and a brake deadman mechanism.

The steering control unit 104 includes a handle 114 mounted at the distal end of a steering arm 116 that is pivotally mounted to the steering control unit 104 as will be described more fully with reference to FIG. 3. The operator uses the handle 114 to control steering, braking and other truck functions. To this end, the handle 114 includes operator controls, such as twist grips 118 for controlling the direction (forward and reverse) and speed of the truck 100, a reverser switch 120, switches 122 and 124 for raising and lowering the forks 106, respectively, and a horn switch 126, see FIG. 2.

The steering arm 116 is moved from side to side to rotate the steering control unit 104 relative to the power unit 102 to determine the steered direction of the truck 100. The steering arm 116 is also used to apply a brake 117 to stop the steerable wheel, see FIGS. 6 and 7 where the steerable wheel brake 117 is shown operated and released, respectively. It will be apparent to those skilled in the art that the steerable wheel brake 117 can be constructed to directly brake the steerable wheel; to brake the traction motor driving the steerable wheel and thereby indirectly brake the steerable wheel; or, to be coupled to a transmission interconnecting the traction motor and the steerable wheel to directly brake the transmission and thereby indirectly brake the steerable wheel. All of these and any other arrangements for braking the steerable wheel will be generically referred to herein as a steerable wheel brake.

Figure 5:
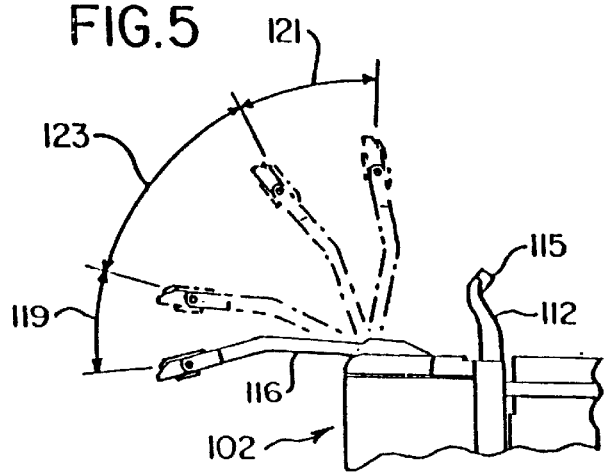
FIG. 5 is a side view of a portion of the truck of FIG. 1 showing the pivoting motion of a steering arm/handle combination of the truck.

For braking the truck 100, the steering arm 116 is moved to either a generally horizontal (down) braking position within a horizontal braking arc 119 or a generally vertical (up) braking position within a vertical braking arc 121, see FIG. 5. For movement of the truck 100, the steering arm 116 is moved to a traveling, operating or driving position within a driving range or arc 123 interposed between the horizontal and vertical braking arcs 119, 121, see FIG. 5. When traveling in the power unit first or forward direction, the truck 100 will be reversed if the reverser switch 120, located at the forward part of the handle 114, is activated. The twist grips 118 are spring biased to a center neutral position. Rotating either of the grips 118 forward will cause the truck 100 to move forward at a speed proportional to the amount of rotation of the grips 118. Similarly, rotating either of the grips 118 toward the rear of the truck 100 will cause the truck 100 to move in reverse again at a speed proportional to the amount of rotation of the grips 118.

As an optional feature on walkie/rider trucks, switches that can be operated from the side of the trucks, referred to as "jog" switches, can also be provided to move or jog the trucks in the forward direction at a predetermined low speed. Jog switches 128 can be located on the outsides of the ends of the handle 114; or, jog switches 130 can be located on the insides of the ends of the handle 114. It is apparent that the jog switches 130 are better sheltered from inadvertent activation since they are protected by the handle 114 and thus are preferred. In any event, an operator walking beside a truck can move the truck by operating the jog switches. While either the jog switches 128 or the jog switches 130 are provided on many walkie/rider pallet trucks equipped with jog switches, an improved jog arrangement including both jog switches 128, 130 on each side of the handle 114 as disclosed in U.S. Pat. No. 5,245,144 provides still better protection against inadvertent activation and is illustrated in the present application. For additional information regarding the improved jog switch arrangement, reference should be made to the '144 patent.

Figure 6:
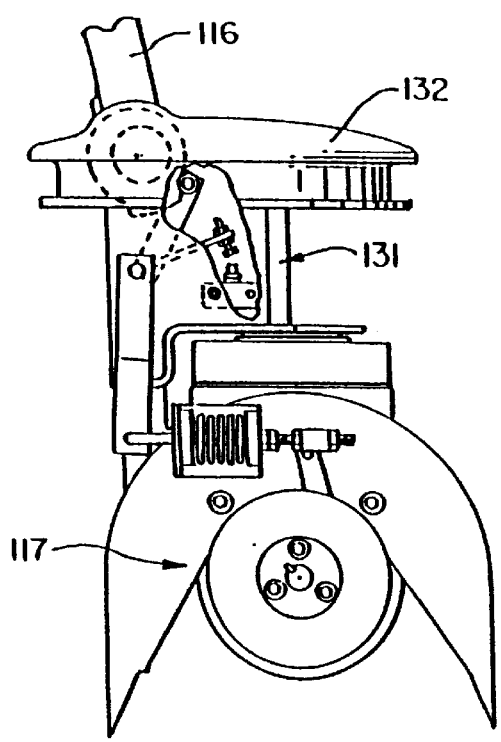
FIGS. 6 and 7 illustrate a steered wheel brake in the operated and non-operated positions, respectively.
Figure 7:
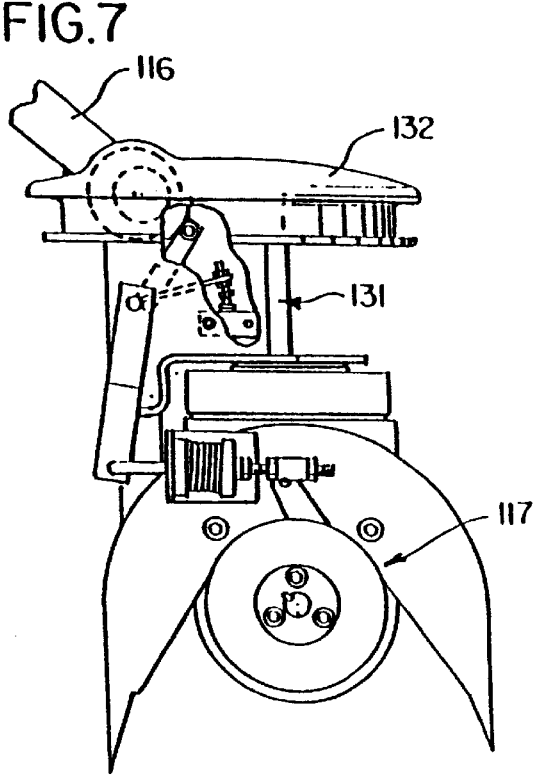

When the steering arm 116 is moved into the horizontal braking arc 119 or the vertical braking arc 121, a switch 131 cuts power to the electric traction motor and actuates the steerable wheel brake 117 to stop the truck 100, see FIGS. 6 and 7. The vehicle brake can, thus, be engaged manually by the operator forcing the arm 116 to a braking position (the up braking position or the down braking position) or, if the operator releases the arm 116, by operation of a brake deadman mechanism 133 that automatically drives the arm 116 into its up braking position. The deadman mechanism 133 is illustrated as that provided on Walkie/Rider Pallet Trucks commercially available from the Crown Equipment Corporation, assignee of the present application, and comprises three torsion springs 133A, 133B and 133C which are coupled between a steering head 132 and the steering arm 116 as shown in FIG. 3. Three torsion springs are provided to facilitate production of the springs and so that a variety of spring forces can be easily selected for varying weight steering arm/handle combinations by selection of the torsion springs. Operation of the deadman mechanism 133 may be prevented by a deadman override device that allows the vehicle to operate in a coast mode.

Overriding the deadman mechanism 133 for coast operation of walkie/rider pallet trucks in accordance with one aspect of the present invention will now be described with reference to FIGS. 3 and 4 which illustrate a relevant portion of the steering control unit 104 of the truck 100 of FIG. 1. The steering arm 116 is mounted to a steering head 132 for pivotal movement about an axis A and is spring biased into a generally vertical braking position within the vertical braking arc 121, i.e., the up braking position, by a torsion spring force generated by the torsion springs 133A–133C that form the brake deadman mechanism 133 for the illustrated embodiment. Thus, when the handle 114 is released by an operator, the springs 133A–133C raise the steering arm 116 to brake the truck 100. Of course, other brake deadman mechanisms can be used in the present invention, for example, the deadman mechanism disclosed in U.S. Pat. No. 5,964,313.

In accordance with the present invention, to provide coast control for the truck 100, a locking device 136 locks the steering arm 116 into any selected position, at least within the driving arc 123, so that the brake deadman mechanism 133 is overridden and prevented from moving the steering arm 116 into its generally vertical, up braking position. While the locking device 136 applies a locking force to the steering arm 116 that overcomes the brake deadman mechanism 133 to fix the steering arm's 116 position, the locking force is selected such that it can be overcome by the operator of the truck 100 for moving the steering arm 116 to manually apply the steerable wheel brake 117 and also for moving the steering arm 116 to other selected locations where the locking device 136 will again retain the steering arm 116. In a working embodiment of the invention, the locking device 136 comprises a steering arm brake as illustrated in the present application. Of course, review of the present disclosure will suggest a number of locking devices that can be used in the present invention, for example, detented or segmented locks wherein a tab can be selectively engaged into one of a plurality of opposing detents to define a corresponding number of locked positions as well as a variety of steering arm brake arrangements in addition to that illustrated in the present application.

When the illustrated steering arm brake is used as the locking device 136, it advantageously provides a virtually limitless number of positions within the vertical movement range of the steering arm 116 into which the steering arm 116 can be locked as opposed to a defined number of positions for a locking device relying on detents or segments that define discrete locking positions. In the illustrated embodiment of FIGS. 3 and 4, the steering arm brake comprises an armature plate 138 and an electromagnet 140 with the brake being engaged by activation of the electromagnet 140 to attract the armature plate 138.

The armature plate 138 is connected to the steering arm 116 and is moved through an arc 139 as the steering arm 116 is moved between its down braking position and its up braking position. In FIG. 4, the armature plate 138 is shown in solid lines when the steering arm 116 is in its down braking position, is shown in dotted lines when the steering arm 116 is in its up braking position and can be positioned anyway between these two extremes as the steering arm 116 is moved between its down braking position and its up braking position. In a working embodiment, the armature plate 138 was made from low carbon steel, such as grades 1008 through 1035, and nickel plated to a thickness of between 0.0007 and 0.0010 of an inch to prevent corrosion and give a smooth surface that reduces noise as the armature plate 138 slides over the electromagnet 140. It is noted that other materials and material finishes can be used for the armature plate 138 of present invention as will be apparent to those skilled in the art.

Figure 4:
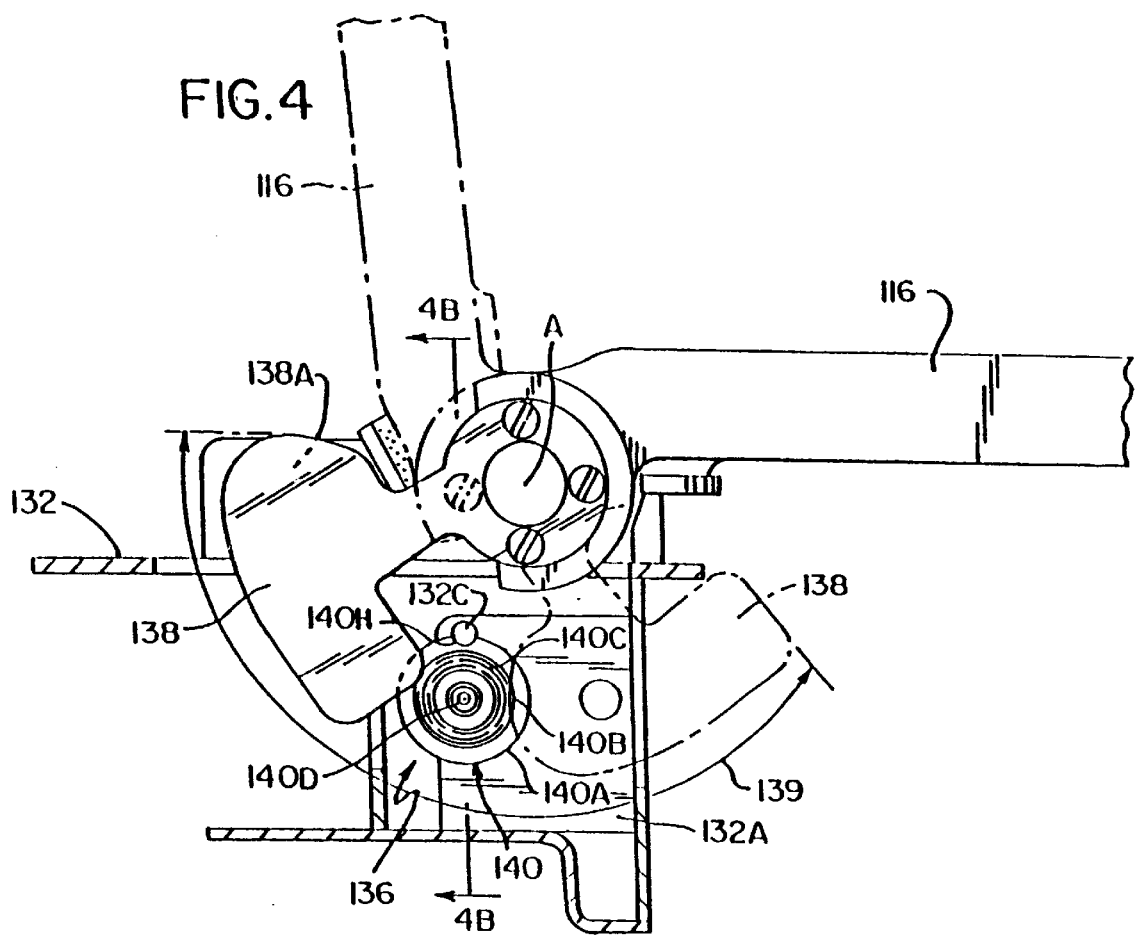
FIG. 4 is a partially broken away side view a portion of the steering control unit of the truck of FIG. 1 showing a steering arm locking device of the present invention.

The electromagnet 140 includes a solid body 140A having an annular groove 140B formed in its forward surface (the surface facing the armature plate 138) for receiving an electrical coil 140C which is electrified to activate the electromagnet 140, see FIGS. 4, 4A and 4B. The electromagnet 140 is supported on a plate 132A connected to the front portion of the steering head 132. A socket head cap screw 140D engages a threaded aperture 132B in the plate 132A to secure a mounting pin 140F to the plate 132A. A bushing 140E is pressed into the solid body 140A of the electromagnet 140 with the mounting pin 140F sized to be received within the bushing 140E. In the illustrated embodiment, the electromagnet 140 is mounted for axial movement relative to the plate 132A and is spring biased away from the plate 132A and into engagement with the armature plate 138 by means of a compression spring 140G.

The compression spring 140G surrounds the mounting pin 140F, extends between the solid body 140A and the plate 132A, and, in a working embodiment, provided a force of about ½ pound, see FIGS. 4A and 4B. By spring biasing the electromagnet 140 into the armature plate 138, the distance between the two is maintained to accommodate tolerance build up in the pivotal mounting of the steering arm 116 to the steering head 132 and to ensure consistent magnetic forces when the brake is applied. The body 140A of the electromagnet 140 is prevented from rotating about its axis by a notch 140H in the body 140A which receives a pin 132C extending from the plate 132A. In the illustrated embodiment, the solid body 140A is retained on the mounting pin 140F against the force of the compression spring 140G by its engagement with the armature plate 138.

In a working embodiment, the body 140A of the electromagnet 140 was made from cold finished steel that has a Salt Bath Nitriding (SBN) finish produced by a ferritic nitrocarburising process that adds both nitrogen and carbon to the ferrous surface of the body 140A. The nitrogen and carbon atoms form a compound layer in the surface and a deep diffusion zone beneath the layer that ranges between approximately 0.0002 and 0.0008 of an inch and that has a hardness of approximately Rockwell C 58 to 60. The surface layer increases corrosion protection, provides lubricating properties for the body and resists abrasive wear between sliding surfaces. The surface layer is also nonmagnetic and provides a nonmagnetic gap, functionally similar to an air gap, between the electromagnet 140 and the armature plate 138 to prevent sticking due to residual magnetism. It is noted that other body materials and material finishes can be used in the present invention as will be apparent to those skilled in the art.

A changing portion of an inner surface 138A of the armature plate 138 is positioned against the electromagnet 140 as the armature plate 138 moves through the arc 139 as the steering arm 116 is moved through the horizontal braking arc 119, the driving arc 123 and the vertical braking arc 121. As shown in FIG. 4, a portion of the armature plate 138 is always against the electromagnet 140 throughout the travel range of the armature plate 138 even though the surface area of the armature plate 138 contacting the electromagnet 140 is reduced to minimums at the ends of the travel range of the armature plate 138 and the steering arm 116.

During movement of the steering arm 116 within the driving arc 123, the electromagnet 140 is substantially fully covered by corresponding portions of the armature plate 138. Thus, the braking force exerted by activation of the electromagnet 140 is assured to lock the steering arm 116 in the position within the driving arc 123 that the steering arm 116 occupies when the electromagnet 140 is activated or in a subsequent position within the driving arc 123 to which the steering arm 116 is moved while the electromagnet 140 is activated. Locking within the horizontal braking arc 119 and the vertical braking arc 121 is not assured; however, locking at any position within the vertical range of motion of the steering arm 116 can be assured by enlargement of the armature plate 138 so that the electromagnet 140 is fully covered at all positions of the armature plate 138 within its travel range, i.e., the arc 139.

As noted above, the braking force is selected so that the steering arm 116 is fixed and not moved by the brake deadman mechanism 133. However, the force can be overcome by an operator to manually apply the steerable wheel brake 117 or to reposition the steering arm 116. To move the steering arm 116, an operator must apply a force greater than the difference between the restraining force or torque generated by the electromagnet 140 and the force or torque applied by the deadman mechanism 133, i.e., the springs 133A–133C. It is currently believed that if the required operator a force is set to a value which prevents movement of the steering arm 116 in response to the truck 100 going over bumps of a common size in the floor that it will be acceptable to all operators of the truck. This force can be increased or reduced for given applications and to accommodate given operators as long as the force is adequate to ensure proper coasting operation of the truck 100. In a working embodiment of the present invention, the proper forces/torques were obtained by using an electromagnet that generated an attractive force of approximately seventy (70) pounds.

It is apparent that the locking device of the present invention provides a coast control for walkie/rider pallet trucks that is mechanically less complicated than many prior art devices and has less parts so that it is easier to assemble and maintain. Further, the locking device enables an operator to position the handle/steering arm at any location within the driving arc and retains the handle/steering arm in that position unless the locking device/coast system is overridden for manually applying the vehicle brake or to reposition the handle/steering arm to a different desired position where it will again be retained.

Figure 8:
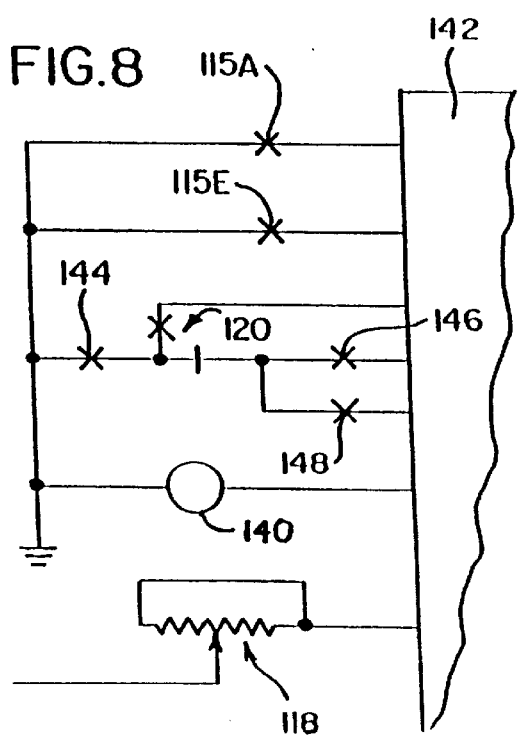
FIG. 8 is a schematic block diagram of a portion of the control system for the truck of FIG. 1.

In addition to the novel deadman brake override system described above, another aspect of the present invention is the control of the system (or any other deadman brake override or coast control system). In the illustrated embodiment of the present invention, control for overriding a deadman brake is incorporated into a controller 142 of the truck 100. See FIG. 8 which is a schematic block diagram of a portion of the control system for the truck 100 wherein normally open contacts are indicated by an "X" and normally closed contacts are indicated by a "I". In a working embodiment of the present invention, the controller 142 is a Sevcon Millipak controller for separately excited motors (SEM) that includes microprocessor control, however, a variety of other controllers can be used in the present invention. Inputs to the controller 142 include the high speed/coast release switch 115A, the coast switch 115E and the twist grips 118. Movement of the truck 100 is enabled by a brake switch 144 which is connected to the reverser switch 120. If the reverser switch 120 is not activated, reverse switch 146 and forward switch 148 are enable so that the direction of travel of the truck 100 is determined by which of the switches 146 and 148 is activated. If the reverser switch 120 is activated, the switches 146 and 148 are disabled and a signal to reverse the truck 100 is sent to the controller 142.

Figure 9:
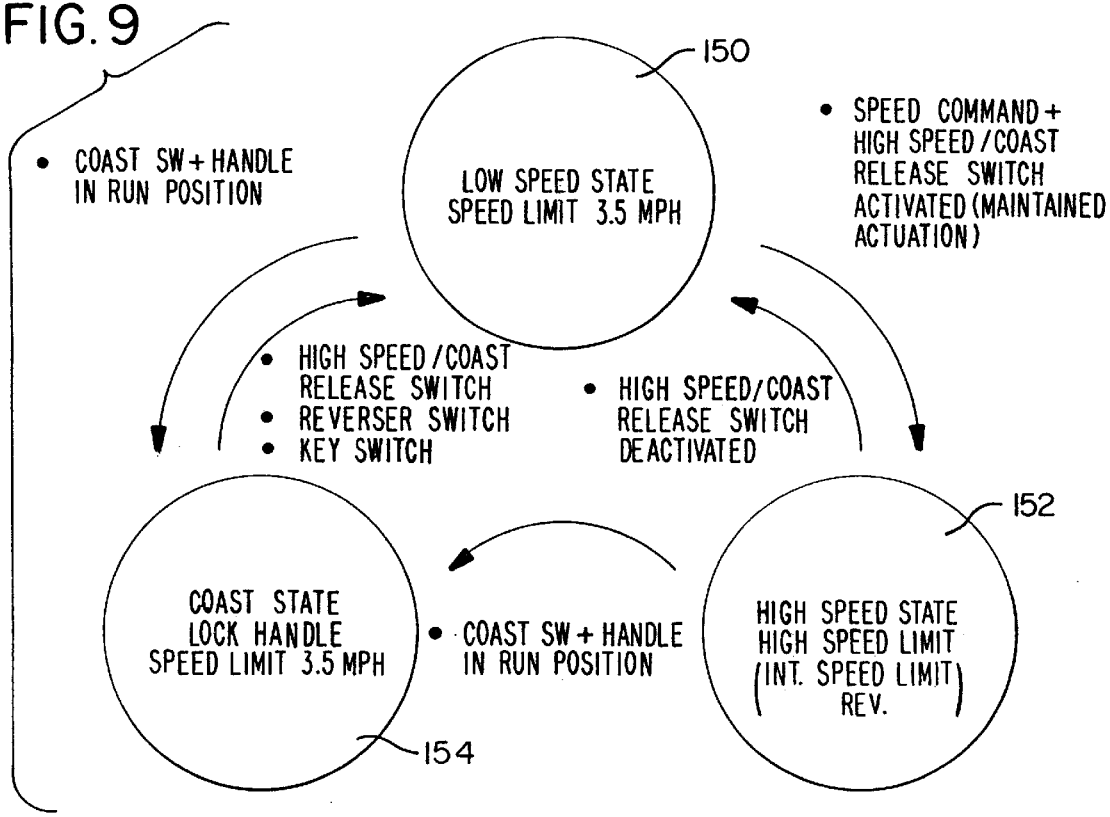
FIGS. 9 and 10 are state diagrams used by the controller of FIG. 8 to operate the truck of FIG. 1 in accordance with one aspect of the present invention.
Figure 10:
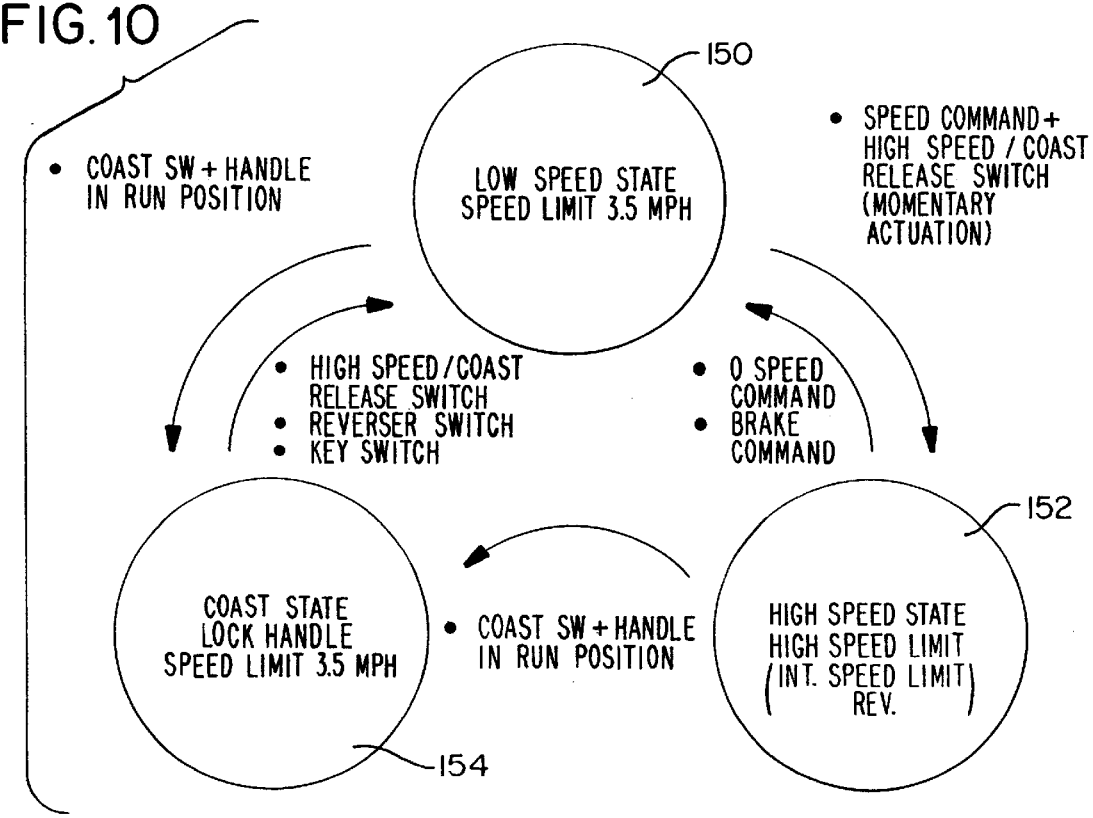

FIGS. 9 and 10 illustrate state diagrams which are used by the controller 142 to operate the truck 100 in accordance with the present invention. In FIG. 9, high speed operation of the truck 100 is enabled by continuous activation of the high speed/coast release switch 115A, i.e., the operator must hold the high speed/coast release switch 115A in its operated position. In FIG. 10, high speed operation of the truck 100 is enabled by momentary activation of the high speed/coast release switch 115A while a speed command is provided, i.e., while the operator maintains either of the twist grips 118 out of their neutral positions. Each of the state diagrams include the same three states: a low speed state 150; a high speed state 152; and, a coast state 154. In the low speed state 150, the speed of the truck 100 is limited to a low speed, for example a walk speed of approximately 3.5 miles per hour (mph) (5.6 kilometers per hour (km/hr)). In the high speed state 152, the truck 100 can be operated: at speeds up to an intermediate speed, greater than the low speed, in the forks first or reverse direction; and, at speeds up to a high speed, greater than the intermediate speed, in the power unit 102 first or forward direction. In the coast state 154, the speed of the truck 100 is limited to a low speed that normally would be the same as the limited low speed of the low speed state 150.

The controller 142 enters the low speed state 150 at key on of the truck 100, i.e., when the truck key is moved from off to on, so that the truck 100 can then be operated at the limited low speed by operation of the twist grips 118 and/or the jog controls, such at the jog switches 128 or 130 (or both the jog switches 128 and 130), if provided. The high speed state 152 can be entered from the low speed state 150 by activating either of the twist grips 118 to generate a speed command (other than zero provided at the neutral position of the twist grips 118) and activation of the high speed/coast release switch 115A. For operation in accordance with the state diagram of FIG. 9, for the truck 100 to be maintained in the high speed state 152, the high speed/coast release switch 115A must remain activated. To relieve the operator of the truck 100 from having to hold the high speed/coast release switch 115A to maintain operation of the truck 100 in the high speed state 152, which is objectionable to some operators, operation of the truck 100 in the high speed state 152 is maintained after the high speed/coast release switch 115A is momentarily made and then released in the state diagram of FIG. 10. While in the high speed state 152, the truck can be operated at speeds up to either the intermediate speed or the high speed, depending upon the direction of movement of the truck, by means of the twist grips 118.

The low speed state 150 is entered from the high speed state 152 by releasing the high speed/coast release switch 115A for the state diagram of FIG. 9. For the state diagram of FIG. 10, the low speed state 150 is entered from the high speed state 152 by movement of the twist grips 118 into their central neutral positions to generate a zero (0) speed command or by application of the steerable wheel brake 117.

In the coast state 154, the speed of the truck 100 is limited to a low speed, such as walk speed, as previously noted. Also, entry into the coast state 154 activates the locking device 136, by engaging the electromagnet 140 in the illustrated embodiment, so that the steering arm 116 is locked into its then current position (or into a position to which it is subsequently moved while in the coast state 154). The coast state 154 is entered from either the low speed state 150 or the high speed state 152 by activation of the coast switch 115E with the steering arm 116 in the truck run position, i.e., within the driving arc 123. While a single coast switch, i.e., the coast switch 115E, is illustrated as being mounted on the back of the control panel 115, the coast switch 115E can be mounted elsewhere on the grab bar 112 or closely positioned to the grab bar 112. Alternately, two coast switches can also be used, one mounted on either side of the control panel 115 or at other locations on the grab bar 112 or otherwise associated with or closely positioned to the grab bar 112.

When in the coast state 154, if the high speed/coast release switch 115A is activated or the reverser switch 120 is activated or the key is switched off and then back on, the controller 142 enters the low speed state 150. For the controller 142 to enter the high speed state 152 from the coast state 154, it first enters the low speed state 150 from which it can go to the high speed state 152 if the high speed/coast release switch 115A is activated and a nonzero speed command is received from the twist grips 118, i.e., either of the twist grips 118 is moved out of its central neutral position.

With the understanding of the present invention gained from the above description of the novel locking device for overriding the deadman brake and the novel control of a deadman brake override system, operation of the truck 100 using the present invention will now be described. When an operator of the walkie/rider pallet truck 100 keys on the truck 100, the controller 142 comes up in the low speed state 150 so that the operator can move the truck 100 at speeds up to the limited low speed for the truck 100 by operation of the twist grips 118 or by activation of jog switches, if provided on a given truck. Once the truck 100 is keyed on, the operator proceeds with stock picking operations by moving the truck 100 along a prescribed route through a warehouse picking up stock in a predetermined sequence.

If the operator's first pick is a good distance from where the truck is keyed on, the operator steps onto the platform 110, grips the grab bar 112 immediately adjacent to the control panel 115 mounted on the grab bar 112, operates (continuously or momentarily) the high speed/coast release switch 115A and moves one of the twist grips 118 to accelerate the truck 100 in a forward direction toward the first pick. These operations advance the controller 142 from the low speed state 150 to the high speed state 152 so that the truck 100 can be operated at speeds up to the high speed for the truck 100. Upon approaching the first pick, the operator moves the twist grip 118 to slow the truck 100 for the pick. Upon releasing the high speed/coast release switch 115A or moving the twist grip 118 to its central neutral position, the controller 142 is placed into the low speed state 150.

As the truck 100 approaches the first pick, the operator brakes the truck 100 and steps from the platform 110. If the operator wants to coast the truck 100 to the first pick, he/she then activates the coast switch 115E to place the controller 142 into the coast state 154 so that the steering arm 116 is locked into the position at which the coast switch 115E was operated by activation of the electromagnet 140 (or other locking device). The operator then moves to the item to be picked, picks up the item and turns around as the truck 100 coasts into a position so that a pallet on the load forks 106 of the truck 100 (or other load support device on the forks 106 or provided in place of the load forks 106) is in position for the operator to place the picked item thereon. The operator then advances the truck 100 to the next pick. If the next pick is close by, the operator walks along side the truck 100 and moves the truck 100 by twisting one of the twist grips 118 (or by activation of the jog switches 128 and/or 130 if jog switches are provided on the truck). If the operator wants to change the vertical position of the steering arm 118 or handle 114 from that locked in when the coast mode of operation was engaged, he/she moves the handle 114 and thereby the steering arm 118 to a new desired position where it is retained by the locking device 136 until once again repositioned by the operator or the steering arm 118 is released by inactivating the coast mode of operation. Again, as the operator approaches the pick, he/she coasts the truck 100 to an appropriate position to place the pick onto the pallet on the forks 106 or other load support device of the truck 100.

If the next pick is some distance away, for example twenty or more feet, the operator may choose to step onto the platform 110 and ride the truck 100 to the next pick location. The operator would then engage the high speed/coast release switch 115A to release the coast control and place the controller 142 into the low speed state 150. The activation of the high speed/coast release switch 115A together with a nonzero speed command from the twist grips 118 moves the controller 142 through the low speed state 150 into the high speed state 152 so that the operator can move the truck 100 at speeds up to the high speed for the truck 100 to more rapidly advance the truck 100 to the next pick location. Upon approaching the next pick location, the operator would brake the truck 100 and step from the platform 110. Presuming that the operator again wants to coast the truck 100 to the pick, the operator then manually actuates the coast switch 115E to place the controller 142 into the coast state 154 so that the steering arm 118 is locked into the position at which the coast switch was operated by activation of the electromagnet 140 (or other locking device).

It is, thus, apparent that operation of the truck 100 for stock picking applications is improved since the coast mode of operation can be conveniently engaged by manual operation of the coast switch 115E mounted on or near the grab bar 112. Once the coast mode of operation is engaged, the truck 100 can remain in the coast mode for two or more closely spaced picks. And, the truck 100 can be quickly changed from the coast mode to the high speed mode and back to the coast mode by manual operation of the high speed/coast release switch 115A and the coast switch 115E. In addition, during operation of the truck 100 in the coast mode, an operator can readily select the position of the handle 114 in accordance with his or her preference and the position of the handle 114 can be readily changed to a new position as operating conditions or the operator's preference changes.

Having thus described the invention of the present application in detail and by reference to preferred embodiments thereof, it will be apparent that modifications and variations are possible without departing from the scope of the invention defined in the appended claims.

What is claimed is:

1. A walkie/rider pallet truck comprising:
   a steerable wheel;
   a steerable wheel brake coupled to said wheel;
   a steering arm coupled to said wheel for steering said wheel and being movable through an arc including a driving arc interposed between a generally vertical braking position and a generally horizontal braking position;
   a handle on said steering arm for control of said truck;
   a deadman mechanism coupled to said steering arm for moving said steering arm into said generally vertical braking position to brake said truck when said handle is released; and
   a locking device coupled to said steering arm for locking said steering arm in one selected position of at least two selectable positions within said driving arc, said locking device preventing movement of said steering arm from said one selected position by said deadman mechanism when said handle is released.

2. A walkie/rider pallet truck as claimed in claim 1 wherein said locking device comprises a steering arm brake.

3. A walkie/rider pallet truck as claimed in claim 2 wherein said steering arm is mounted to a steering head for movement relative thereto and said steering arm brake comprises an armature plate mounted to said steering arm and moveable with said steering arm, and an electromagnet mounted to said steering head, said armature plate being positioned relative to said electromagnet so that when said steering arm brake is engaged by activation of said electromagnet, said armature plate is attracted by said electromagnet.

4. A walkie/rider pallet truck as claimed in claim 3 wherein said electromagnet and said armature plate are resiliently biased into engagement with one another.

5. A walkie/rider pallet truck as claimed in claim 3 wherein said electromagnet is resiliently biased into engagement with said armature plate.

6. A walkie/rider pallet truck as claimed in claim 2 wherein said at least two selectable positions comprise substantially any position within said driving arc.

7. A walkie/rider pallet truck as claimed in claim 1 wherein said locking device provides a locking force to maintain said one selected steering arm position, said locking force being such that it can be overcome for manual application of said steerable wheel brake or for repositioning said steering arm to another selected position of said steering arm.

8. A walkie/rider pallet truck comprising:
   a steerable wheel;
   a steerable wheel brake coupled to said wheel;
   a steering arm coupled to said wheel for steering said wheel and being movable through an arc including a driving arc interposed between a generally vertical braking position and a generally horizontal braking position;
   a handle on said steering arm for control of said truck;
   a deadman mechanism coupled to said steering arm for moving said steering arm into said generally vertical braking position to brake said truck when said handle is released; and
   a steering arm brake coupled to said steering arm for preventing movement of said steering arm from a selected position due to said deadman mechanism so that said steering arm does not move substantially from said selected position when said steering arm brake is engaged and said handle is released.

9. A walkie/rider pallet truck as claimed in claim 8 wherein said steering arm is mounted to a steering head for movement relative to said steering head and said steering arm brake comprises an electromagnet coupled to said steering head and an armature plate coupled to said steering arm, said armature plate being moveable relative to said electromagnet as said steering arm is moved relative to said steering head, said steering arm brake being engaged by activation of said electromagnet to attract said armature plate.

10. A walkie/rider pallet truck as claimed in claim 8 wherein said steering arm brake provides a braking force to maintain said selected position for said steering arm at least within said driving arc.

11. A walkie/rider pallet truck as claimed in claim 8 wherein said steering arm brake provides a braking force to maintain said selected position for said steering arm, said braking force being selected so that it can be overcome for manual application of said steerable wheel brake or for repositioning said steering arm to another selected position at which said steering arm is to be again retained.

12. A walkie/rider pallet truck comprising:
   a steerable wheel;
   a steerable wheel brake coupled to said wheel;
   a steering arm coupled to said wheel for steering said wheel and being movable through an arc including a driving arc interposed between a generally vertical braking position and a generally horizontal braking position;

a handle on said steering arm for control of said truck;

a deadman mechanism coupled to said steering arm for moving said steering arm into said generally vertical braking position to brake said truck when said handle is released;

a steering arm brake coupled to said steering arm for preventing movement of said steering arm from a selected position due to said deadman mechanism so that said steering arm does not move substantially from said selected position when said brake is engaged and said handle is released; and an actuator for manually activating said steering arm brake.

13. A walkie/rider pallet truck as claimed in claim 12 wherein said actuator comprises at least one coast actuation switch.

14. A walkie/rider pallet truck as claimed in claim 12 wherein said steering arm brake provides a braking force which can be overcome for manual application of said steerable wheel brake and for repositioning said steering arm to selected steering arm positions at least within said driving arc.

15. A walkie/rider pallet truck as claimed in claim 12 wherein said truck further comprises a grab bar and a control panel mounted on said grab bar, said actuator being included in said control panel.

16. A walkie/rider pallet truck as claimed in claim 12 wherein said steering arm is mounted to a steering head for movement relative thereto and said steering arm brake comprises an armature plate mounted to and moveable with said steering arm, and an electromagnet mounted to said steering head, said armature plate being positioned relative to said electromagnet so that when said steering arm brake is engaged by activation of said electromagnet, said armature plate is attracted by said electromagnet.

17. A walkie/rider pallet truck as claimed in claim 16 wherein said truck further comprises a grab bar and a control panel mounted on said grab bar, said actuator being included in said control panel.

18. A walkie/rider pallet truck as claimed in claim 17 wherein said actuator comprises at least one coast actuation switch for activating said electromagnet.

19. A walkie/rider pallet truck comprising:

a steerable wheel;

a steerable wheel brake coupled to said wheel;

a steering arm coupled to said wheel for steering said wheel and being movable through an arc including a driving arc interposed between a generally vertical braking position and a generally horizontal braking position;

a handle on said steering arm for control of said truck;

a deadman mechanism coupled to said steering arm for moving said steering arm into said generally vertical braking position to brake said truck when said handle is released;

a grab bar that is to be gripped by an operator riding on said truck;

a coast control mechanism coupled to said steering arm for overriding said deadman mechanism so that said steering arm does not move into said vertical braking arc when said handle is released; and an actuator for manually activating said coast control mechanism, said actuator being located adjacent a gripping position of an operator's hand while gripping said grab bar.

20. A walkie/rider pallet truck as claimed in claim 19 wherein said actuator is located on said grab bar.

21. A walkie/rider pallet truck as claimed in claim 20 wherein said truck further comprises a control panel mounted on said grab bar, said actuator being included in said control panel.

22. A walkie/rider pallet truck as claimed in claim 21 wherein said actuator comprises at least one coast actuation switch for activating said coast control mechanism.

23. A method for controlling a walkie/rider pallet truck including a steerable wheel, a steerable wheel brake coupled to said wheel, a steering arm coupled to said wheel for steering said wheel and also being movable through an arc including a driving arc interposed between a substantially vertical braking position and a substantially horizontal braking position, and a handle on said steering arm for control of said truck, said method comprising the steps of:

providing a deadman mechanism for said steerable wheel brake to move said steering arm into said vertical braking position to brake said truck when said handle is released; and selectively locking said steering arm into a desired position to prevent movement of said steering arm from said desired position by said deadman mechanism when said handle is released.

24. A method for controlling a walkie/rider pallet truck as claimed in claim 23 wherein said desired position is within said driving arc.

25. A method for controlling a walkie/rider pallet truck as claimed in claim 23 wherein said step of selectively locking said steering arm into a desired position comprises the step of braking said steering arm.

26. A method for controlling a walkie/rider pallet truck as claimed in claim 25 wherein said steering arm is mounted to a steering head for movement relative thereto and said step of braking said steering arm comprises the steps of:

mounting an electromagnet to said steering head;

mounting an armature plate to said steering arm so that said armature plate is moveable with said steering arm and positioned to be attracted to said electromagnet; and activating said electromagnet to attract said armature plate.

27. A method for controlling a walkie/rider pallet truck as claimed in claim 26 wherein said step of selectively locking said steering arm into a desired position comprises generating a locking force to maintain said desired position and said method further comprises selecting said electromagnet and said armature plate so that said locking force can be overcome for manual application of said steerable wheel brake or for repositioning said steering arm to another desired position.

* * * * *

(12) EX PARTE REEXAMINATION CERTIFICATE (7240th)
United States Patent
Koeper et al.

(10) Number: US 6,464,025 C1
(45) Certificate Issued: Dec. 15, 2009

(54) COAST CONTROL FOR WALKIE/RIDER PALLET TRUCK

(75) Inventors: John Ivan Koeper, New Bremen, OH (US); Daniel Carl Magoto, Russia, OH (US); Allen Thomas Trego, New Bremen, OH (US); James Francis Schloemer, New Bremen, OH (US)

(73) Assignee: Crown Equipment Corporation, New Bremen, OH (US)

Reexamination Request:
No. 90/008,902, Feb. 11, 2008

Reexamination Certificate for:
Patent No.: 6,464,025
Issued: Oct. 15, 2002
Appl. No.: 09/855,333
Filed: May 15, 2001

(51) Int. Cl.
*B62D 1/14* (2006.01)

(52) U.S. Cl. ....................... 180/19.2; 180/332
(58) Field of Classification Search .............. None
See application file for complete search history.

(56) References Cited

U.S. PATENT DOCUMENTS

| 3,419,104 | A |   | 12/1968 | Messenger |
| 3,791,474 | A |   | 2/1974 | Stammen et al. |
| 4,356,875 | A | * | 11/1982 | Clune .......................... 180/13 |
| 5,964,313 | A |   | 10/1999 | Guy |
| 6,464,025 | B1 |  | 10/2002 | Koeper et al. |

\* cited by examiner

*Primary Examiner*—Jeffrey L. Gellner

(57) ABSTRACT

A coast control device for a walkie/rider pallet truck locks the position of a steering arm of the truck to prevent movement by a deadman mechanism. The disclosed locking device is a brake: an armature plate mounted to the steering arm; and an electromagnet coupled to a steering head that is operated to activate coasting operation. The brake force can be overcome by an operator to manually apply the truck brake or to reposition the steering arm to a new position where it is again locked. For contolling coasting operation, the brake is manually engaged by an actuator mounted adjacent to or on a grab bar that is to be gripped by an operator riding on the truck. With the actuator so located, coasting operation can be conveniently engaged while the operator is walking beside the truck.

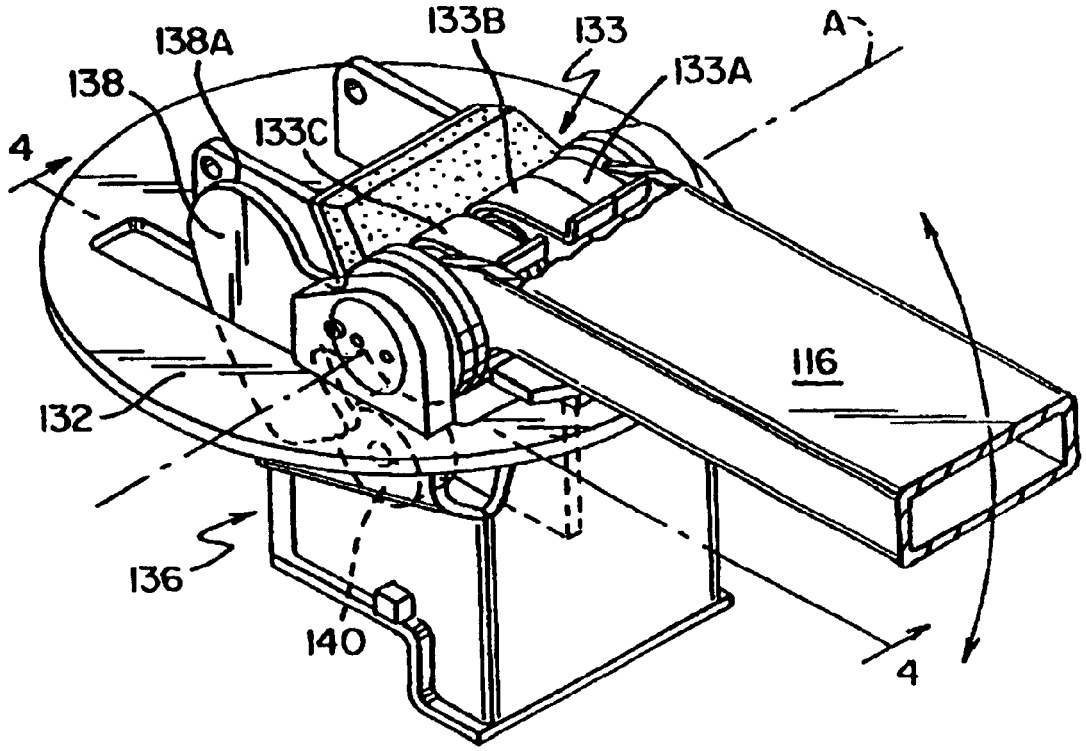

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 19 and 23 are determined to be patentable as amended.

Claims 20–22 and 24, dependent on an amended claim, are determined to be patentable.

Claims 2–18 and 25–27 were not reexamined.

1. A walkie/rider pallet truck comprising:
a steerable wheel;
a steerable wheel brake coupled to said wheel;
a steering arm coupled to said wheel for steering said wheel and being movable through an arc including a driving arc interposed between a generally vertical braking position and a generally horizontal braking position;
a handle on said steering arm for control of said truck;
a deadman mechanism coupled to said steering arm for moving said steering arm into said generally vertical braking position to brake said truck when said handle is released; and
a locking device coupled to said steering arm for locking said steering arm in one *operator* selected *locking* position *of at least two operator* selectable *locking* positions *within said driving arc*, said locking device preventing movement of said steering arm from said one selected *locking* position by said deadman mechanism when said handle is released.

19. A walkie/rider pallet truck comprising:
a steerable wheel;
a steerable wheel brake coupled to said wheel;
a steering arm coupled to said wheel for steering said wheel and being movable through an arc including a driving arc interposed between a generally vertical braking position and a generally horizontal braking position;
a handle on said steering arm for control of said truck;
a deadman mechanism coupled to said steering arm for moving said steering arm into said generally vertical braking position to brake said truck when said handle is released;
a grab bar that is to be gripped by an operator riding on said truck, *said grab bar being separate and distinct from said handle and said steering arm*;
a coast control mechanism coupled to said steering arm for overriding said deadman mechanism so that said steering arm does not move into said vertical braking arc when said handle is released; and
an actuator for manually activating said coast control mechanism, said actuator being located adjacent a gripping position of an operator's hand while gripping said grab bar.

23. A method for controlling a walkie/rider pallet truck including a steerable wheel, a steerable wheel brake coupled to said wheel, a steering arm coupled to said wheel for steering said wheel and also being movable through an arc including a driving arc interposed between a substantially vertical braking position and a substantially horizontal braking position, and a handle on said steering arm for control of said truck, said method comprising the steps of:
providing a deadman mechanism for said steerable wheel brake to move said steering arm into said vertical braking position to brake said truck when said handle is released; and
selectively locking said steering arm into *an operator* desired *locking* position *of at least two operator selectable locking positions within said driving arc* to prevent movement of said steering arm from said desired *locking* position by said deadman mechanism when said handle is released.

* * * * *